United States Patent Office

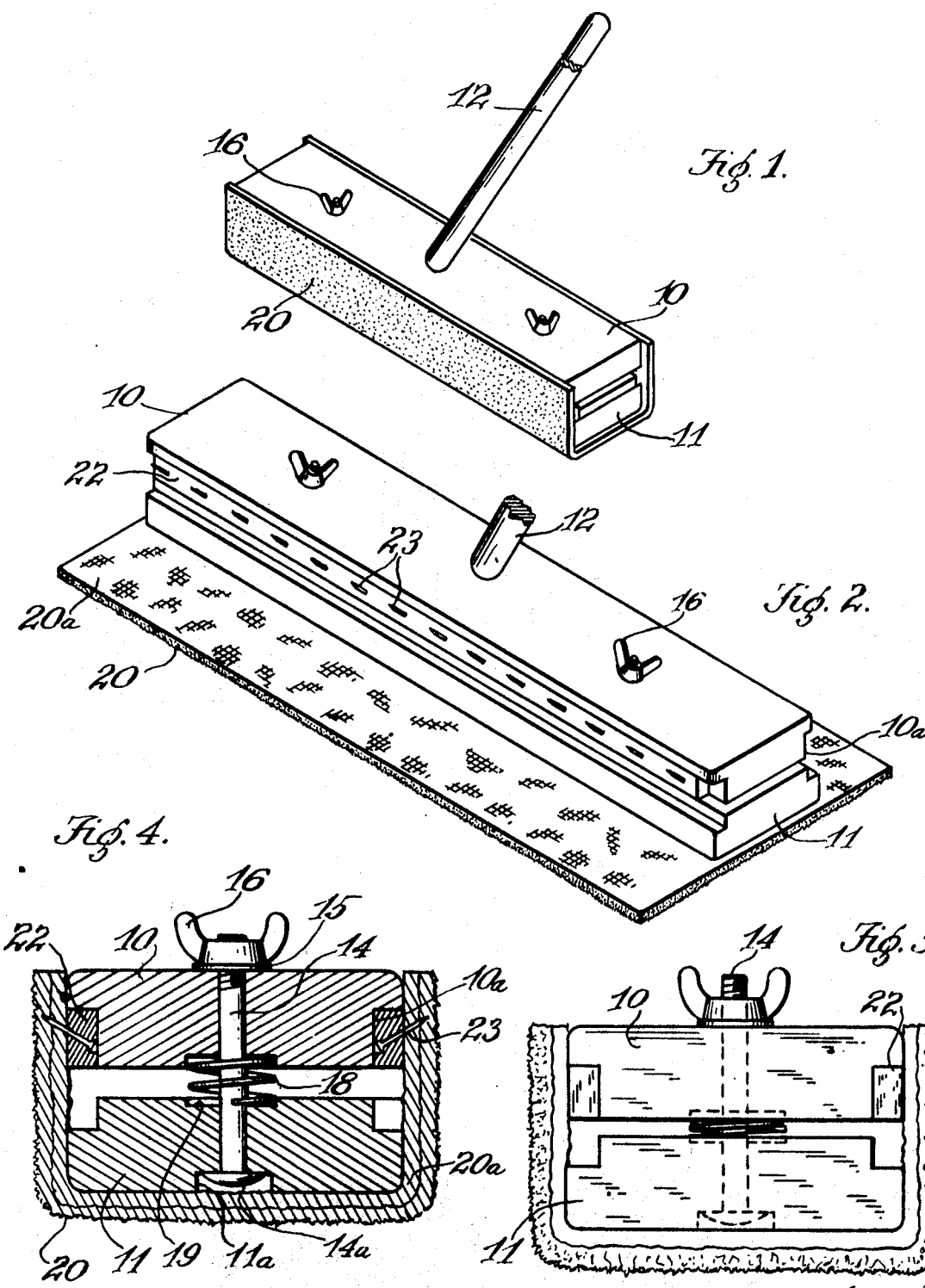

3,626,541
Patented Dec. 14, 1971

3,626,541
FLOOR CLEANING AND WAXING IMPLEMENTS
William A. Boettcher, 4507 N. Clark St.,
Chicago, Ill. 60640
Filed Oct. 29, 1969, Ser. No. 872,064
Int. Cl. A47l 13/46
U.S. Cl. 15—233                                                            4 Claims

ABSTRACT OF THE DISCLOSURE

An implement carried at the lower end of a stick for cleaning or waxing floors. The implement is a headpiece having upper and lower cross-bars held together by bolts directed upwardly from the lower bar through the upper one to receive wing nuts; and the upper bar is urged by compression springs between the bars to separate from the lower one. A pad designed to carry a cleaning or waxing solution receives the bar assembly and rises along its sides. The upper bar carries outwardly projecting and upwardly slanted barbs; and advancing the wing nuts lowers the upper bar for impaling the sides of the pad on the barbs. The consequent retraction of the wing nuts causes the upper bar to draw the pad into taut engagement with the lower one.

---

My invention relates to implements carried at the end of a stick for cleaning or waxing floors. Such implements are usually in the form of a headpiece to which an absorbent pad is attached on the under side, the pad containing a floor cleaning or waxing solution. A more efficient implement for this purpose consists of a headpiece made up of upper and lower bars. The pad is held in trough shape to receive the lower bar, and the bars are assembled in spaced relation to allow the ends of the pad to be tucked between the bars. These are then clamped together to secure the pad to the headpiece. This method of securing the pad may be practical in theory, but experience with pads so secured reveals that tucking the end-portions of the pad between the bars of the headpiece is often difficult or partial, either because the bars are too close or unevenly spaced. As a result, the end-portions of the pad are clamped in some places and not in others, allowing the pad to loosen or become detached from the headpiece.

In view of the above situation, it is one object of the present invention to provide an implement of the type mentioned with means which do away with tucking-in the end-portions of the pad, such means securing a positive hold on such end-portions at all points.

A further object is to provide an implement which changes the gathering action of the headpiece bars for clamping the end-portions of the pad to an action which draws on them with the effect of firmly engaging the pad with the headpiece along its entire length.

Another object is to exert a pulling action on the end-portions of the pad by securing them to the upper bar of the headpiece and urging such bar to separate from the lower one, whereby to firmly wrap the pad around the headpiece.

An additional object is not to materially change the existing implement, but add simple means to the same for the easy application and secure retention of the pad.

A better understanding of the invention may be gained by reference to the accompanying drawing, in which—

FIG. 1 is a perspective view, on a reduced scale, of the implement in readiness for use;

FIG. 2 is a similar view, on a larger scale, showing the bars of the headpiece closely spaced, and the pad spread out underneath the headpiece;

FIG. 3 is a full-sized end view of the headpiece as in FIG. 2, and the pad wrapped around the headpiece; and FIG. 4 is a similar view in cross-section, showing the bars of the headpiece separated, and means to connect them and engaging the end-portions of the pad.

Referring specifically to the drawing, 10 and 11 denote the upper and lower bars of the headpiece under consideration; and a stick 12 is secured to the upper bar for supporting the headpiece.

The bars 10 and 11 are connected to each other at longitudinally-spaced points, the means for this purpose being shown more clearly in FIG. 4. Thus, the bars are bored vertically to receive a pair of bolts 14 from the bottom, the bar 11 being recessed in the bottom as shown at 11a to seat the heads 14a of the bolts. The upper end-portions of these project from the bar 10 to receive washers 15 and wing nuts 16. A wide and sturdy compression spring 18 surrounds each bolt 14 in the space between the bars 10 and 11; and these are recessed at 19 to seat the ends of the spring and keep it centered in relation to the bolt. The headpiece described so far is conventional; and the floor cleaning or waxing pad 20 is initially applied to the headpiece by first spreading the pad underneath the same as shown in FIG. 2, and drawing the sides of the pad up to form a trough, as shown in the other figures.

When the pad 20 is placed as in FIG. 2, the invention requires that the bar 10 of the headpiece be depressed close to the bar 11, as shown in FIGS. 2 and 3, this being done by screwing the wing nuts 16 down as shown in those figures. This action compresses the spring 18 as shown in FIG. 3. The invention involves the cutting of a pair of side recesses 10a in the bar 10, and securing filler strips 22 therein by cement or glue. The strips are flush with the bar 10 on the outer side; and they are equipped with a longitudinal series of barbs 23 before their application to the bar 10. FIG. 4 shows that the barb heads are flush with the filler strips on the inner side, and slanted upwardly to project with their sharp points from the outer side.

The pad 20 is composed of a layer of absorbent chenille fibers projecting from a tough fabric layer 20a. In order to secure the pad to the headpiece, the side portions of the pad are drawn up as in FIG. 2 and hooked on the projecting barbs 23 in the manner indicated in FIG. 4. The wing nuts 16 are now turned in the unscrewing direction, this permitting the spring 18 to raise the bar 10 and draw the pad into snug engagement with the headpiece.

The advantages of the improved implement should now be readily apparent. First, a special headpiece bar 10 need not be made to receive the barbs 23, since the bars 10 of headpieces readily available on the market can be made suitable for the invention by simply cutting the side recesses 10a in quantities by machine means. Further, the separate strips 22 are more readily fitted with the barbs 23 in a suitable jig or machine, whereas it may not be possible to drive thin barbs directly through the hardwood stock of the bar 10 in order to avoid using the strips. Further, hooking the end-portions of the pad on a considerable number of barbs (see FIG. 2) is a simple task insuring a positive hold on the pad along its entire length. Finally, the constant pressure of the spring 18 to draw the pad taut insures its permanent engagement and proper condition for application to the floor.

I claim:

1. A floor treating implement comprising upper and lower bars arranged in companion relation, a pad under the lower bar with portions extended from the sides thereof and raised to adjoin the sides of the upper bar, means carried by the latter to attach said portions, and second means to separate the upper bar from the lower one and draw the pad into taunt engagement with the latter, the upper bar having a pair of spaced recesses, said first-mentioned means comprising a strip secured in each recess, and a row of barbs driven into each strip from the inner side disposed in said recess and projecting in an upward direction from said upper bar, said portions being removably impaled on the related row of barbs.

2. An applicator head for applying wax and the like to floors comprising:

upper and lower bar means in displaceable relation;
spring means interposed between said bar means for normally urging the bars apart;
replaceable applicator pad means juxtaposed beneath the lower bar means and having upper portions wrapped around corresponding sides of the lower bar means and adjacent sides of said upper bar means,
said upper bar means including laterally projecting pin means removably anchoring said pad means portions thereon for permitting said spring means acting between said bar means to normally urge the applicator pad means into taut relation beneath said lower bar means, and manual pressure urging said bar means together relieves the pressure normally imposed by said spring means and permits said applicator means to be readily removed and replaced, said pin means comprising pointed barb elements terminally anchored in the upper bar means on opposite sides thereof and diverging upwardly and outwardly therefrom.

3. The structure as claimed in claim 2 in which said bar means include bolt means extending transversely therethrough and retaining said bar means to a maximum, adjustable spacing, said spring means comprising compression spring means circumposed about said bolt means and terminally engaging respective bar means.

4. The structure as claimed in claim 1 in which said recesses are in opposite sides of said upper bar.

References Cited

UNITED STATES PATENTS

| | | | |
|---|---|---|---|
| 630,440 | 8/1899 | Bauer | 15—231 UX |
| 684,592 | 10/1901 | Trost | 15—153 |
| 736,736 | 8/1903 | Kane | 15—230.17 |
| 952,186 | 3/1910 | Courtois | 51—390 |
| 1,139,809 | 5/1915 | Schultz | 15—231 X |
| 1,460,329 | 6/1923 | King | 15—231 X |
| 1,599,906 | 9/1926 | McKnight | 51—392 X |
| 1,681,648 | 8/1928 | Root | 51—390 |
| 1,745,486 | 2/1930 | Hill | 15—120 |
| 1,973,779 | 9/1934 | Raney | 15—233 |

FOREIGN PATENTS

| | | | |
|---|---|---|---|
| 207,723 | 6/1959 | Austria | 51—390 |

DANIEL BLUM, Primary Examiner